March 16, 1965  J. L. WALTER  3,173,582
FEED MIXER
Filed March 15, 1961  3 Sheets-Sheet 1

INVENTOR.
JULIAN L. WALTER
BY
ATTORNEY.

March 16, 1965
J. L. WALTER
3,173,582
FEED MIXER
Filed March 15, 1961
3 Sheets-Sheet 2
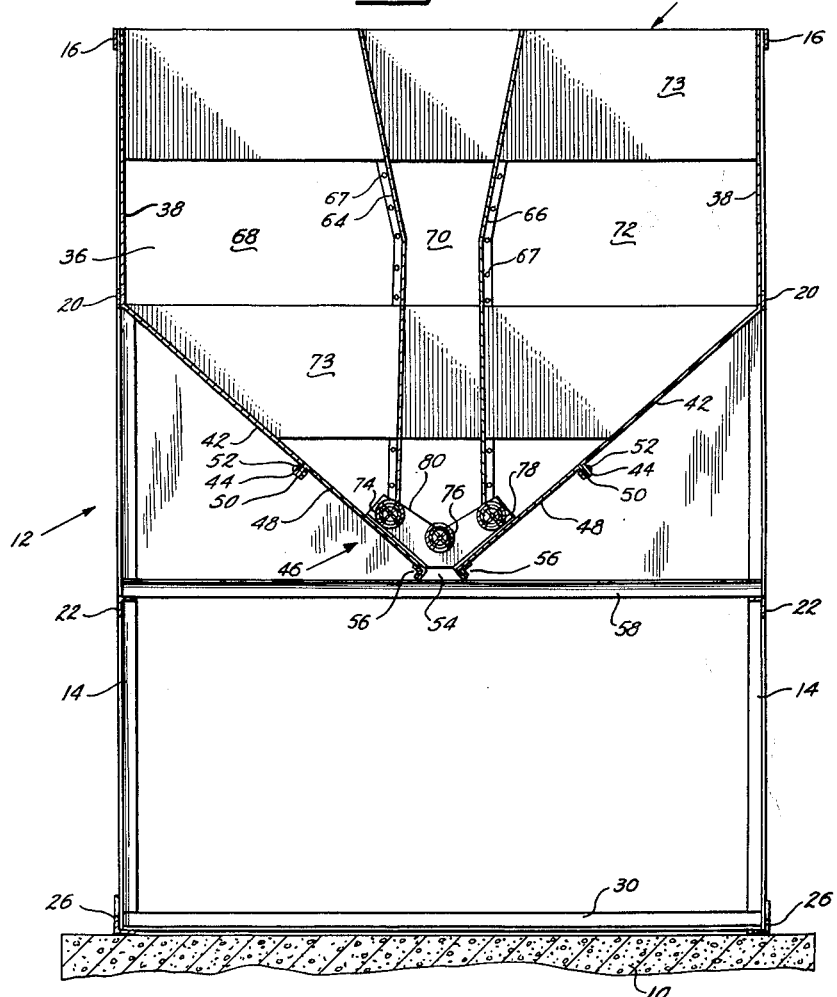
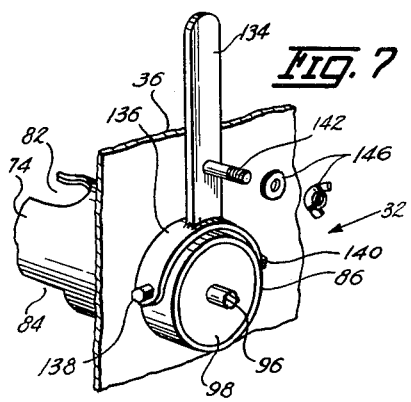
INVENTOR.
JULIAN L. WALTER
BY Morton S. Adler
ATTORNEY.

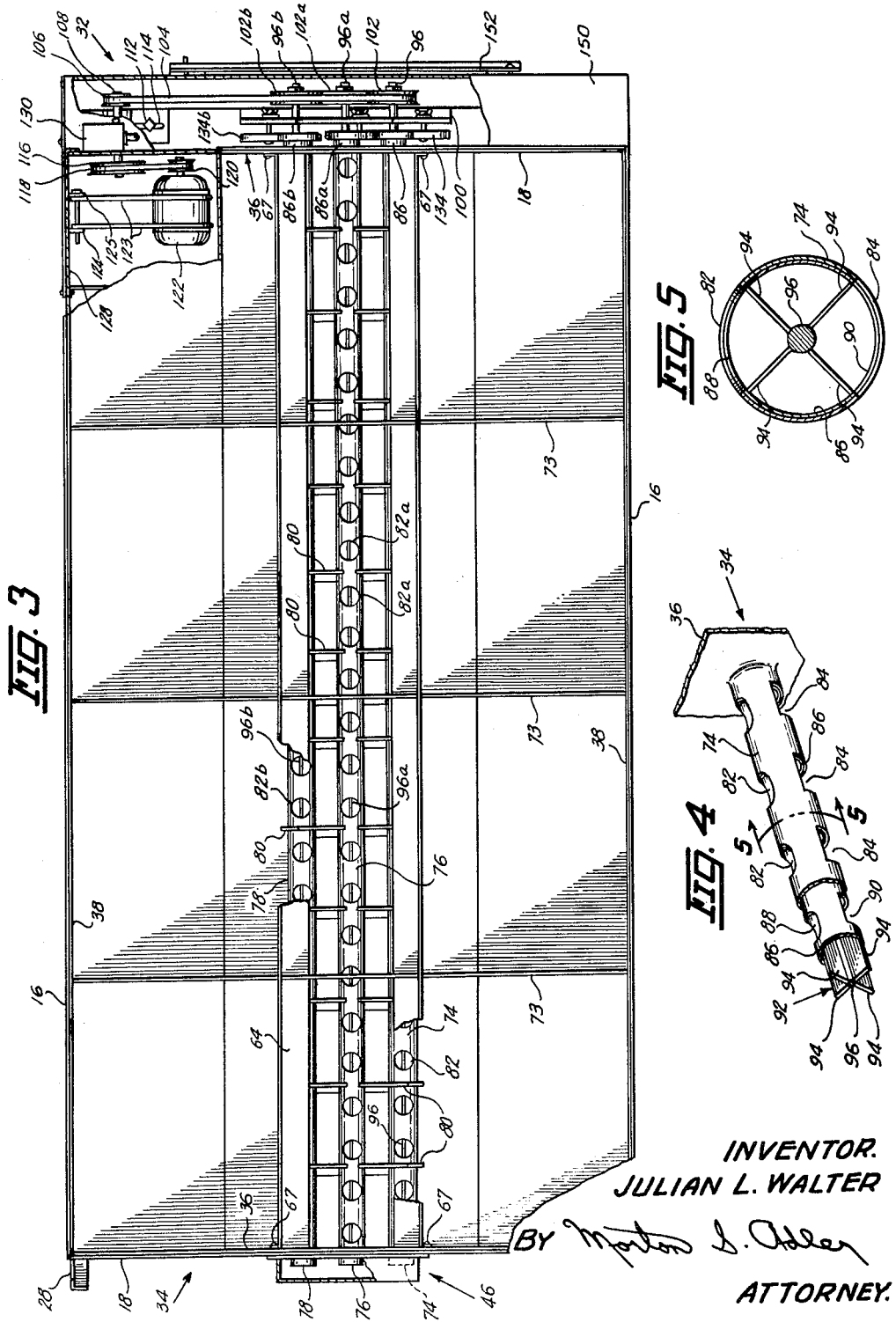

United States Patent Office 3,173,582
Patented Mar. 16, 1965

3,173,582
FEED MIXER
Julian L. Walter, Rte. 2, Lenox, Iowa
Filed Mar. 15, 1961, Ser. No. 95,955
2 Claims. (Cl. 222—185)

This invention relates to an improved device for mixing and dispensing feed for livestock, such as hogs, cattle and poultry.

One of the important objects contemplated herein is the provision of an improved apparatus for collecting different livestock feeds and feed supplements from a plurality of bins, hoppers or other sources of supply and mixing and dispensing the same for consumption by the livestock.

Another object is to provide a feed mixer of the above class from which the total amount of feed dispensed can be selectively regulated, and in which the ratio or proportion of any particular type feed or feed supplement relative to the total admixed amount dispensed can be regulated in any desired percentage.

A further important object inhering in this invention is the provision of feed mixer as characterized which will dispense mixed feed at an elevated height above the reach of the livestock so that the mixed feed falls upon a suitable feed slab, or the ground, and to which the livestock will have free and unobstructed access without the necessity of rooting or routing the same out of a restricted bin, chute, chamber or the like.

More particularly this invention contemplates the provision of a plurality of feed supply hoppers which deliver feed by gravity to separate feed metering devices that in turn discharge the feed simultaneously into a common mixing chamber from which the mixed feed from the several hoppers can fall onto a feeding slab.

Further objects and the more obvious advantages of the invention will be mentioned or else appear plainly from the description which follows.

Figure 1:
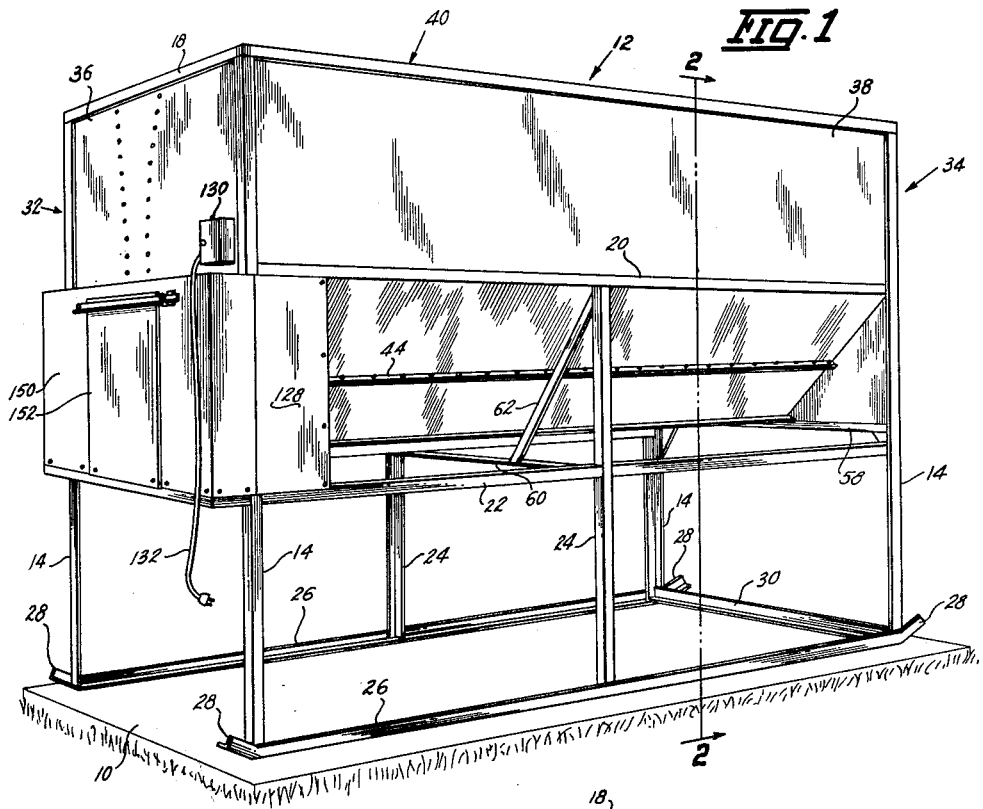
Figure 6:
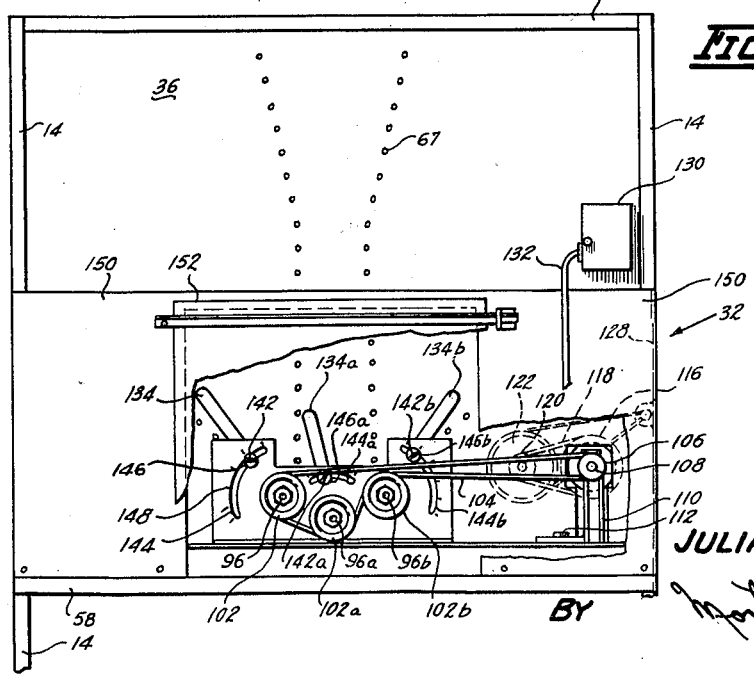

This invention consists of novel parts and combination of parts to be hereinafter described whereby the objects set forth are attained, as pointed out in the claims, and illustrated in the accompanying drawings, in which:

FIG. 1 is a perspective view showing a preferred embodiment of my new feed mixer, FIG. 2 is a cross sectional view taken on the line 2—2 of FIG. 1, FIG. 3 is an enlarged top plan view with portions of each end cut away to more fully illustrate the construction thereof, FIG. 4 is an enlarged fragmentary perspective view of one of the feed metering and dispensing devices used with this mixer, FIG. 5 is an enlarged cross sectional view taken on the line 5—5 of FIG. 4, FIG. 6 is an end view taken from the line 6—6 of FIG. 3 with portions of the door removed to more fully illustrate the driving means arranged therein, and FIG. 7 is an enlarged perspective view illustrating the control lever at the forward end of one of the metering tube assemblies.

Referring to the drawings a concrete slab 10 is preferably used not only as a level supporting base for this feed mixer 12, but also as a feeding surface as will later become apparent. However, it will be understood that slab 10 is not necessarily required and the mixer 12 may be placed directly on the ground, if desired.

Mixer 12 includes a rectangular frame, of angle iron or the like, having the vertically disposed corner posts 14, top horizontal side rails 16 and end rails 18, vertically spaced horizontal intermediate rails 20 and 22, intermediate vertical posts 24 and spaced horizontal rails or skids 26 to which the several vertical posts are attached as shown in FIG. 1. The ends of the skids 26 may be upwardly inclined as at 28 and a cross brace or rail 30 is secured between the lower ends of two opposite corner posts 14 at one end of the frame structure. For purposes of further description, mixer 12 will be referred to as having a front end 32 and a rearward end 34.

Ends 32 and 34 are enclosed by sheet metal panels 36 from the respective top end rails 18 to the level of rails 22, and the frame sides are enclosed by similar panels 38 between the top rails 16 and the level of the rails 20 to form the sides and ends of a large hopper or feed storage member designated generally by the numeral 40. The bottom of hopper 40 while a unitary functional unit is preferably made with an upper and lower section as shown in FIG. 2 where the upper section is defined by sheet metal panels 42 converging from the bottom edges of panels 38 throughout their length to terminate at a point spaced above the level of rail 22 in the outwardly projecting flange 44, and the lower section represented generally by the numeral 46 which is my new metering and dispensing mechanism that will be referred to in more detail as this description proceeds. However, for purposes of description at this point it will be noted that section 46 includes panels 48 converging from top to bottom which complement the inclination of panels 42 and have flanges 50 for abutting engagement with flanges 46 and are attached thereto by rivets or the like 52. The bottom of section 46 terminates in a flared opening 54 defined by angled panel edges 56 that rest on and are supported by a cross brace 58 extending between posts 14 slightly above the level of rails 22. Additional bracing for the frame structure of mixer 12 is provided by cross brace 60 between posts 24 at the level of rail 22 and diagonal braces 62 extending from posts 24 at the level of rails 20 downwardly and inwardly to brace 60.

The interior area of hopper 40 is divided longitudinally by the spaced partitions 64 and 66 and are secured to the respective front and rear panels 36 by rivets 67. Such partitions form the three bins or feed storage compartments 68, 70 and 72, and stiffeners of sheet metal or the like 73 are disposed in the upper hopper area transversely of partitions 64 and 66 in a suitable spaced relationship for reinforcement purposes. The spacing of panels 64 and 66 is such that bin 70 is wider at the top and at the center and is wider at the bottom than at the center as shown in FIG. 2.

Referring now to assembly 46, I have used three horizontally disposed outer tubular members 74, 76 and 78 in a closely spaced relationship of a modified V shape in cross section as shown in FIG. 2. By this arrangement, tubes 74 and 78 are on the same plane and spaced slightly higher and laterally from tube 76 so as to conform to the general configuration of the bottom of hopper 40. These tubes are securely connected to each other in the relationship described by a plurality of longitudinally spaced webs or gussets 80 and the respective ends of each tube 74, 76 and 78 are secured to the respective end panels 36 at the front and rear ends 32 and 34 as shown in FIG. 3. The construction and operation of tubes 74, 76 and 78 and the parts associated therewith are the same and thus a description of one such tube in detail will suffice for the other two. For this purpose, the detail illustrations in FIGS. 4 and 5 have been designated as representing tubular member 74 for further description and like parts for members 76 and 78 will be given like numerals followed by the letters "a" and "b" respectively. Along the top of the tube 74 there are a plurality of longitudinally spaced feed inlet openings 82 and oppositely disposed thereto on the bottom or underside of the tube are the similarly arranged feed outlet openings 84. While the shape of either set of openings 82 and 84 is not material, it is preferable that the size of the outlet openings 84 be somewhat larger than the inlet openings 82 as is apparent in FIG. 4.

An inner tubular member 86, coextensive in length with the outer tube 74 is rotatably disposed within such outer tube and is provided with a plurality of inlet and outlet openings, 88 and 90 respectively, that are similarly arranged as openings 82 and 84 in tube 74. Such openings 88 and 90 are adapted to register with openings 82 and 84 respectively but by rotation of tube 86 are movable in relation thereto to act as closures or partial closures for openings 82 and 84 as will later appear in more detail.

Rotatable within the inner tubular member 86 throughout its length is the paddle-type dispensing wheel 92 containing preferably four equally spaced blades 94 radially disposed on a shaft 96 (FIGS. 4 and 5). The respective ends of shaft 96 are rotatably supported in disc shaped plugs 98 secured in each respective end of the inner tubular member 86. At the front end 32 of mixer 12, shafts 96, 96a and 96b project through a vertical support plate 100 (FIGS. 3 and 6) that is carried by the brace 58 at mixer end 32. The forward ends of these shafts, forwardly of plate 100 carry the respective pulley wheels 102, 102a and 102b which are driven by a belt 104 (FIG. 6) that is attached to a small pulley 106 on shaft 108 near one of the posts 14. Shaft 108 is carried by a suitable I beam support 110 mounted to rail 58 by bolts 112. For this purpose beam 110 has slots 114 so that it can be adjustably positioned to regulate slack in belt 104. Shaft 108 also carries a larger pulley wheel 116 which is connected by belt drive 118 to a smaller pulley wheel 120 on an electric motor 122 (FIG. 3), such motor being secured by rigid straps 123 pivotally mounted between spaced ears 124 and 126 on panel 128 (FIG. 1) extending between rails 16 and 20 at one side of the front end 32. Thus, motor 122 maintains tension on belt 118 by its own weight in a well known manner. Motor 122 is connected to and actuated by suitable electric time clock 130 attached to the outer side of panel 36 at the front end 32. Electric cord 132 provides means of attaching clock 130 to a source of electric current.

Rotation of the respective inner tubular members 86, 86a and 86b is separately accomplished by the respective lever members 134, 134a and 134b which are similarly constructed and for which reference is made to FIG. 7 wherein the lever shown is identified as 134 for purposes of further description. One end of lever 134 terminates in the center of a transversely disposed arcuate semicircular strap 136 and forwardly of panel 36 at mixer end 32 the free ends of strap 136 are secured at diametrically opposed points on tube 86 by bolts 138 and 140 which are threadably engaged through tube 86 and into plug 98. Thus manual manipulation of lever 134 will rotate tube 86 on its longitudinal axis to vary the registering relationship between the respective feed inlet and outlet openings in the inner and outer tubular members 86 and 74. Each lever 134, 134a and 134b is provided with a boss 142, 142a and 142b respectively that is slidably arranged in the respective arcuate slots 144, 144a and 144b in plate 100 by respective pins and washer members 146, 146a and 146b. Suitable markings or indicia 148 may be placed on slots 144, 144a and 144b to indicate whether the feed inlet and outlet openings are in full registering position or in a specified position less than full registration such as one fourth, one half or three fourths, for example.

At the forward end 32 of mixer 12 a housing 150 with a removal door or panel 152 is provided for enclosing the apparatus forwardly of panel 36 as shown in FIGS. 3 and 6.

With this mixer constructed as described, it will be noted that the discharge opening 54 of hopper 40 is located at a high enough point above the feeding surface or floor 10 so as to be completely out of reach of the livestock that is intended to be fed. As a result it is not necessary for such livestock to root or rout the feed out of any restricted enclosure such as a bin, chute or the like. The metering assemblies in hopper bottom 46 composed of tubes 74, 76 and 78 and their related parts as described above permit a measured amount of feed from each of the bins 68, 70 and 72 to become comingled and mixed in bottom 46 before dropping out of opening 54 as shafts 96, 96a and 96b rotate. By adjusting the relative positions of the respective feed inlet and outlet openings in the separate feed metering assemblies in bins 68, 70 and 72, the ratio or proportion of feed in each bin to the total amount dispensed can be selectively determined as desired and such percentages can be easily determined with the aid of the scale or calibrations 148.

The total amount of mixed feed to be dispensed is controlled by a suitable timing device for which I have used a commercially available electric time clock 130 to start and stop motor 122 at predetermined intervals. In determining the timing interval for clock 130 the number, size and type of animal to be fed together with the quantity or pounds of desired feed that can be dispensed during a given period will, of course, be a matter to be determined so that the total feed dispensed over a given period will meet the feeding requirements and schedule of the particular operator.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a feed mixer, the combination of an upstanding frame over a feeding surface, a feed supply hopper carried by said frame, said hopper having a discharge end spaced substantially above said feeding surface, feed metering and dispensing means in said hopper for dispensing feed through said discharge end so that it can fall onto said feeding surface, said metering and dispensing means including an outer tubular member in said discharge end and coextensive in length therewith, said tubular member having a plurality of spaced feed inlet openings for receiving feed from said hopper, said tubular member also having a like number of feed outlet openings as inlet openings and each respective outlet opening being oppositely disposed to and registering respectively with one of said respective inlet openings to provide a feed discharge path from said discharge end, an inner tubular member rotatably concentrically disposed within said outer tubular member, said inner tubular member being provided with respective feed inlet and outlet openings similar to those in said outer tubular members, the respective openings in said inner tubular member registering with the corresponding openings in said outer tubular members, means for rotating said inner tubular member whereby the openings in said outer tubular members can be selectively opened or closed to any desired degree, a paddle type wheel rotatably disposed within said inner tubular member, and means for rotating said wheel for discharging feed out of said outlet openings and into said discharge end.

2. In a mixing and dispensing device for livestock feed, the combination of an elongated feed supply hopper having an elongated restricted discharge opening at the bottom thereof, means for supporting said hopper over a feeding surface so that said discharge opening is at a height above the reach of any livestock intended to feed on said feeding surface, an elongated inner and outer tubular member respectively in telescoping relationship disposed in the bottom of said hopper so as to intersect the flow of feed from said hopper to said discharge opening, each tubular member provided on its upper suface with longitudinally spaced feed inlet openings and similarly provided on its underside with a like number of longitudinally spaced feed outlet openings, such feed inlet and outlet openings being uniformly arranged so that those on one tubular member register with the corresponding openings on the other tubular member, means for rotating said inner tubular member about its longitudinal axis whereby the respective feed inlet and outlet openings on said outer tubular member can be selectively opened or closed to any desired degree, said feed outlet openings in communication with said discharge opening, the registration of said feed inlet and outlet openings affording a passageway for the flow by gravity of feed from said hopper to said discharge opening where it will fall upon said feeding surface, a shaft concentrically arranged in said inner tubular member, means for rotating said shaft, a plurality of spaced radially arranged blades on said shaft and rotatable therewith, rotation of said blades urging feed out of said feed outlet openings, and said blades when stationary serving as a closure for the feed passageway through said tubular members.

References Cited in the file of this patent

UNITED STATES PATENTS

| | | |
|---|---|---|
| 601,897 | Michon | Apr. 5, 1898 |
| 1,247,453 | Prohaska | Nov. 20, 1917 |
| 2,310,620 | Dye | Feb. 9, 1943 |
| 2,786,448 | McMaster | Mar. 26, 1957 |
| 3,032,239 | Whitley et al. | May 1, 1962 |